United States Patent [19]

Sant'Angelo

[11] Patent Number: 5,536,806
[45] Date of Patent: Jul. 16, 1996

[54] SUBSTANTIALLY CRYSTALLINE POLY(ALKYLENE CARBONATES), LAMINATE AND METHODS OF MAKING

[75] Inventor: Joseph G. Sant'Angelo, South Whitehall Township, Lehigh County, Pa.

[73] Assignee: PAC Polymers Inc., Newark, Del.

[21] Appl. No.: 328,902

[22] Filed: Oct. 25, 1994

Related U.S. Application Data

[63] Continuation-in-part of Ser. No. 54,429, Apr. 28, 1993.

[51] Int. Cl.$^6$ .......................... C08G 64/00; B32B 27/36; B28B 3/20; C09J 5/00
[52] U.S. Cl. .......................... 528/196; 528/354; 528/421; 428/412; 428/483; 264/176.1
[58] Field of Search ..................... 428/412, 483; 156/306; 528/421, 354, 196; 264/176.1

[56] References Cited

U.S. PATENT DOCUMENTS

| | | | |
|---|---|---|---|
| 2,789,968 | 4/1957 | Reynolds et al. | |
| 3,900,424 | 8/1975 | Inoue et al. | |
| 4,142,021 | 2/1979 | Dixon et al. | 428/412 |
| 4,407,877 | 10/1983 | Rasmussen | 428/114 |
| 5,037,950 | 8/1991 | Bezada et al. | 528/354 |

FOREIGN PATENT DOCUMENTS

| | | |
|---|---|---|
| 2546534 | 4/1977 | Germany. |

OTHER PUBLICATIONS

Manual of Patent Examining Procedure, Appendix AI, p. AI–43, Rev. 14, Nov. 1992.

*Primary Examiner*—P. C. Sluby

[57] ABSTRACT

Disclosed are oriented poly(alkylene carbonates) useful in packaging film for food and other oxygen effected substances. These oriented polymers include poly(alkylene carbonates) with substantial crystallinity. Also disclosed is the crystallization of amorphous poly(alkylene carbonates) by stretching or orienting them. Further disclosed are (1) a high oxygen barrier, high clarity laminate resistant to delamination, that has a layer comprising an oriented, low oxygen barrier, predominantly crystalline polymer, and another layer adherent directly or indirectly thereto and comprising an oriented poly(alkylene carbonate) preferably with substantial crystallinity; and (2) a method for making the laminate from the polymer and the amorphous counterpart of the poly(alkylene carbonate).

20 Claims, No Drawings

5,536,806

SUBSTANTIALLY CRYSTALLINE POLY(ALKYLENE CARBONATES), LAMINATE AND METHODS OF MAKING

CROSS REFERENCE TO RELATED APPLICATION

The application is a continuation-in-part of the application, Ser. No. 08/054,429, filed Apr. 28, 1993, for Crystalline Poly(Alkylene Carbonates).

BACKGROUND OF INVENTION

1. Field of Invention

This invention relates to synthetic resins, particularly high molecular weight, normally solid polymers of alkylene oxides and carbon dioxide. Such polymers are referred to in the art as poly(alkylene carbonates), and frequently in this specification as "PACs" or in the singular as "PAC".

2. Description of Prior Art

PACs have been known for many years, but have not achieved widespread commercial use for a number of reasons. One reason is that up to now those polymers made from the more readily commercially available alkylene oxides such as ethylene oxide and propylene oxide are amorphous. They have no definite melting points, and, compared to synthetic resins in general, have low glass transition temperatures and low decomposition temperatures. For example, the typical $T_g$ of poly(ethylene carbonate), ("PEC"), of 50,000 number-average molecular weight is 10°–28° C., and the typical $T_g$ of poly(propylene carbonate), ("PPC"), of 50,000 number-average molecular weight is 40° C. The typical decomposition temperature of PEC is 220° C., and of PPC is 250° C. While these and other properties make these polymers useful as heat decomposable, mold patterns in the manufacture of articles by the casting of metals, and as sacrificial binders in the manufacture of articles by sintering molded ceramic and metallic powders, they also have limited the utility of these PACs.

The U.S. Pat. No. 3,706,713, to Hull et al. discloses compositions comprising polymers of carbon dioxide and one or more of aliphatic (including cycloaliphatic) 1,2-monoepoxides having at least four carbon atoms per molecule. The compositions are stated to be useful in moldings, films and fibers. The patent discloses that the polymers had crystallinity when made from cycloaliphatic epoxides, and very little crystallinity when made from isobutylene oxide.

It is well known that most polymers described as crystalline are not completely crystalline. They contain amorphous fractions. However, the crystalline fractions usually are predominate as far as polymer properties are concerned. Hence, such polymers are referred to herein as predominantly crystalline polymers.

It also is known that some predominantly crystalline polymers at temperatures in a range (depending on the polymer) below their melting points, but above normal room temperatures, can be stretched up to a point of breakage or failure, and, while maintaining them in the stretched condition, cooled to a temperature at which they will retain their stretched condition until heated to temperatures in that range or at or above their melting points. The resulting polymers, characterized by increased clarity and other physical properties including impact strength, are described as oriented. If the stretching is only in one direction as, for example, in the plane of a film of such a polymer, the polymer or film is said to be uniaxially oriented. If the stretching is in transverse directions, the polymer is described as biaxially oriented. An example of a predominantly crystalline polymer that can be oriented is predominantly crystalline polypropylene which generally has an orientation temperature range of about 140°–165° C. Indeed, biaxially oriented polypropylene packaging film is a well known article of commerce.

The U.S. Pat. No. 4,142,021, to Dixon et al. discloses laminates with water and oxygen barrier properties, which comprise a base layer and an adhesive barrier layer. The base layer can be polymeric, metallic or fibrous. Examples of the base layer include polyethylene, polypropylene and ethylene-propylene copolymers. The adhesive barrier layer is a PAC. The patent discloses forming the laminates by (a) solvent casting the PAC over the base layer, and evaporating the solvent, (b) applying a melt of the PAC to the base layer, and then compressing the two layers, or (c) coextruding melts of the two layers and bonding the layers together at the time of extrusion. No specific disclosures of a substantially crystalline PAC, stretching of the PAC, or an oriented polymer laminate appear to be present in this patent.

SUMMARY OF INVENTION

In summary, the invention in one aspect comprises a novel PAC, the alkylene units of which are selected from the group consisting of $C_2$–$C_8$ acylic hydrocarbons and cyclopropylene without or with $C_1$–$C_4$ hydrocarbon substituents, which alkylene units can be the same or different. The PAC is novel in that it has substantial crystallinity, that is, crystallinity to the extent the PAC has a melting point. It, therefore, is useful as a material of construction for molded and extruded articles.

This invention in another aspect comprises a method for crystallizing an amorphous PAC. The method comprises stretching the amorphous PAC at a temperature above its glass transition temperature, but below its decomposition temperature, the extent of stretching being sufficient to cause crystal formation to the extent a melting point is obtained, but insufficient to cause failure, that is, to cause the polymer to be pulled apart. The method further comprises maintaining the PAC below its melting point in the stretched condition.

Stretching of the amorphous PAC causes it to be oriented in each direction of stretch. The more it is oriented the greater are its clarity and impact strength, and ultimately its crystallinity, thus making it even more useful, for example in barrier films and the like. Hence, this invention in another broad aspect comprises substantially oriented PAC with or without crystallinity, and a method for obtaining it. In one embodiment the orientation is uniaxial. In another embodiment it is biaxial. Preferred species of these embodiments include substantially oriented PEC and substantially oriented PPC. The method is the same as the crystallization method, except that in one embodiment the stretching is insufficient to cause substantial crystal formation, but is sufficient to cause substantial orientation of the PAC.

This invention in another aspect comprises a high oxygen barrier, high clarity, laminate having high resistance to delamination. The laminate comprises at least two plys, the first of which consists essentially of a substantially crystalline PAC, and the second of which consists essentially of a low oxygen barrier, predominantly crystalline polymer, with said first ply being in direct or indirect (as by a tie layer) adherence to the second ply. The laminate in the form of film or sheet is useful in food and medical packaging. The laminate in the form of a tube is useful as a conduit for water or oxygen sensitive liquids. The laminate in the form of a filament or a rod, in either case the plys being concentric or longitudinally side by side, is useful as a fiber or as a load bearing structural element.

The invention in still another aspect comprises a method for making a high oxygen barrier, high clarity laminate with high resistance to delamination. The method comprises three essential steps. The first step comprises making a laminate with at least two plys, the first of which consists essentially of an orientable, predominantly crystalline polymer unoriented in the direction of at least one axis of the plane of the ply, and the second of which consists essentially of an amorphous PAC, with the second ply being in direct or indirect adherence to the first ply. The second step requires the temperature of the laminate to be in a range in which the polymer is orientable and above the glass transition temperature of the amorphous PAC, but below its decomposition temperature. The step comprises stretching the laminate in at least said direction until the predominantly crystalline polymer has become oriented in that direction. The third step comprises cooling the laminate, while maintaining it in its stretched condition, to a temperature at which the predominantly crystalline polymer is dimensionally stable and retains its orientation.

DETAILED DESCRIPTION OF THE INVENTION

As to the novel, substantially crystalline PAC of this invention, examples of $C_2$–$C_8$ acyclic hydrocarbons are ethylene, propylene, butylene, isobutylene, t-butylene, pentylene, 4-methylpentylene hexylene, heptylene, octylene, and the like. Examples of cyclopropylene with $C_1$–$C_4$ hydrocarbon substituents comprise 3-methyl-cyclopropylene, 2-ethyl-cyclo-propylene, and the like. Preferred embodiments of the substantially crystalline PAC include substantially crystalline poly(ethylene carbonate) and substantially crystalline poly(propylene carbonate).

Specific embodiments of the substantially crystalline PAC of this invention are characterized by melting point temperatures. Indeed, these temperatures are substantially above the temperatures at which there is decomposition of the completely amorphous counterparts of these embodiments. These and other physical properties including clarity and enhanced adhesion to substrates make them even more attractive than such amorphous counterparts for use as barrier layers in film and sheet laminates for food and medical packaging.

The orientation method of this invention is applicable to any PAC, and the crystallization embodiment of the method is applicable to any amorphous PAC.

In the orientation method, including its crystallization embodiment, the stretching step can be performed in a number of ways. In one way a film or sheet of the amorphous PAC is pulled in opposite directions. In another it is held at one end and pulled at the other. In still another it is extruded onto a moving substrate to which it readily adheres, which substrate is moving faster than the PAC emerging from the extruder die, whereby the amorphous PAC becomes stretched, and a coated substrate or laminate is formed. Examples of the substrate are given in the above cited U.S. Pat. No. 4,142.0211. A suitable temperature range or the stretching step is 120°–150° C.

Preferred embodiments of the laminate of this invention include those obtained by the laminate method of this invention.

In the laminate method, the orientable predominantly crystalline polymer preferably has sufficient crystallinity such that below its melting point it is normally dimensionally stable, that is, it retains its free-standing shape in the absence of an applied force. In addition, it must be orientable in at least one direction, that is, it must have the capability such that a piece of it in a temperature range above normal room temperatures, but below its melting point temperature, can be stretched in that direction up to, but not beyond, the point of failure, and, while in the stretched condition, can be cooled to a temperature at which it will remain in that condition, i.e., a temperature at which it is dimensionally stable. Preferably and usually it is orientable in both the X and Y axes of the plane of the ply. Also, it must be orientable at a temperature between the glass transition temperature and the decomposition temperature of the amorphous PAC. Examples of such a polymer include the predominately crystalline, orientable polyolefins of commerce. A preferred polyolefin is orientable, predominately crystalline polypropylene. The typical softening point of this polymer is about 160° C. It also is well known as a low oxygen barrier polymer.

The first step of the laminate method can be performed in a number of ways. For example, in one embodiment of the method, the starting laminate is made by solvent casting, that is, by depositing a solution of the amorphous PAC on a preformed ply or substrate containing the orientable, predominately crystalline polymer, and then evaporating the solvent to form the ply or layer of amorphous PAC. In another embodiment, it is made by casting (as by extrusion) a melt of the amorphous PAC on the preformed substrate, compressing the layers to obtain adhesion, and cooling the molten layer until it becomes dimensionally stable. In still another embodiment, the two plys are coextruded, and compressed to obtain adhesion while being cooled to soldify at least the polymer substrate.

Although in most embodiments of the laminate of this invention the amorphous PAC will be adjacent and in direct adherence to the polymer substrate, it is within the broader concepts of this invention to have a tie layer between the amorphous PAC and the polymer substrate as when the amorphous PAC can not be readily adhered directly to the substrate, but the tie layer can be readily adhered to both the amorphous PAC and the substrate. In such case the tie layer material should be as stretchable as the amorphous PAC and the substrate.

Also, the laminate can have three or more plys as long as the ply containing the amorphous PAC is directly or indirectly adhered to the orientable, predominantly crystalline polymer ply.

Also, instead of the laminate being flat, it can be in the form of a tube or a rod (including a filament) with the orientable, predominantly crystalline polymer being the inner layer or core with the PAC layer surrounding it, or with the PAC layer being the inner layer or core with the orientable, predominantly crystalline polymer layer surrounding it. In the case of a rod (including a filament), the layers can be longitudinally side by side.

In the laminate method, the stretching step can be performed in several ways. In one embodiment, the laminate, in the form of a piece of sheet or film, is placed in a tenter frame or the like such as used in the manufacture of film, heated to the orientation temperature range of the substrate, if the temperature of the laminate is below that range, stretched uniaxially or biaxially or in all directions until the substrate is oriented, and cooled to a temperature at which the oriented, predominantly crystalline polymer retains its stretched condition. In another embodiment, the laminate, in the form of a sheet or film is introduced into the nip of a first set of counter rotating rolls which can be chill rolls if the laminate when introduced into the nip is at a temperature above the orientation temperature range of the orientable, predominantly crystalline polymer, as can happen when the laminate has just been formed by coextrusion, or heat rolls if the temperature of the laminate when introduced into the nip is below the orientation temperature range. In either case, the rolls function to establish the laminate in the orientation temperature range. The laminate emerging from the rolls is introduced into the nip of a second set of rolls counter rotating at a sufficiently higher speed to cause the laminate emerging from the first set of rolls to be drawn or stretched to the extent the predominantly crystalline polymer layer becomes oriented uniaxially. The second set of rolls can be chill rolls, or followed by another set of rolls, which function to reduce the temperature of the laminate below the orientation temperature range. In still other embodiments, the laminate in the form of a tube or a rod (including a filament) can be formed by coextrusion followed by stretching as in the blow molding of bottles, the well known method of making air-blown film, or the melt-spinning (which includes drawing) of fibers.

In the laminate method and laminates of this invention, each ply layer can comprise, in addition to the essential polymeric component specified herein for that ply, an additive or additives, such as, for example, anti-degradants such as, for example, antioxidants, heat stabilizers and ultraviolet light inhibitors; processing aids; property improvers such as, for example, plasticizers; colorants; degradant promoters; and the like; provided such is or are not at a substantially adverse concentration or substantially adverse concentrations relative to the application of the principles of this invention. In this regard, the expression "consisting essentially of" as used in this specification excludes any unrecited substance at a concentration sufficient to substantially adversely affect the essential properties of the composition of matter being defined, while permitting the presence of one or more of unrecited substances at a concentration or concentrations insufficient to substantially adversely affect said essential properties.

Features of this invention are demonstrated by the laboratory data presented below. These data were obtained on four film samples. Sample 1 was an oriented, monolayer film of predominantly crystalline polypropylene. Sample 2 was an oriented, three-layer laminate in which the two outer layers were predominantly crystalline polypropylene, and the inner layer was substantially crystalline PEC. Sample 3 was also a three-layer laminate with the two outer layers being predominantly crystalline polypropylene, but the inner layer was substantially crystalline PPC. Sample 4 was an oriented, monolayer film of a blend of predominantly crystalline polypropylene and amorphous PEC. These film samples were prepared as follows.

The Sample 1 film was prepared by first making a 0.6 mm cast sheet of unoriented, predominantly crystalline polypropylene by melt extrusion from pellets of a commercially available, general purpose, predominantly crystalline polypropylene (Pro-fax 6523 propylene homopolymer resin). The typical melt flow rate of this polypropylene is about 4 dg/min per ASTM Test Method D 1238—Condition L. Also, it contains a relatively small, but effective, concentration off anti-degradant material including a conventional antioxidant. The extrusion was by means of a 3.8 cm Killian extruder operated under these conditions: temperature profile of 232° C., 249° C., 249° C., 249° C., 254° C.; 100 rpm; 98.4 kg/cm$^2$; 276° C. melt; 9.5 amps; and with a 47° C. chill roll. Subsequently, the film was biaxially oriented on a T. M. Long film stretcher operated at 7.6 cm/sec and 145° C. to give a 6X—6X simultaneous stretch. In the operation of the stretcher, after the film had been stretched, it was maintained in the stretched condition until its temperature fell below 140° C.

For use in the Samples 2 and 3 films, a 0.3 mm east sheet of predominantly crystalline polypropylene was made by melt extrusion from pellets of the same lot of the commercially available, general purpose, polypropylene used to make the Sample 1 film. The extrusion was by means of a 3.8 cm Killian extruder operated under these conditions: temperature profile of 232° C., 232° C., 232° C., 243° C. and 243° C.; 260° C. melt; and with a 66° C. chill roll.

In making the Sample 2 film, small pieces of approximately 0.05 mm film were made on a 1.9 cm Brabender extruder, operated at 166° C. and 70 rpm, from pellets consisting essentially of an amorphous PEC (QPAC 25 resin), the typical $T_g$ of which is 10°–28° C., and the typical melt flow index of which is 1.4 g/10 min at 150° C./2160 g per ASTM Test Method D-1238. These pieces were placed in a Carver press and pressed at 149° C. to form a large enough, 0.05 mm film for the next step. In this step the 0.05 mm amorphous PEC film was placed between two panels of the 0.3 mm cast polypropylene film, and the combination was compressed at 160° C. at 423 kg/cm$^2$ pressure for 2 minutes, and then cooled while compressed under this pressure. Subsequently, the film was biaxially oriented on a T. M. Long film stretcher operated at 7.6 cm/sec and 155° C. to give a 6X—6X simultaneous stretch. In the operation of the stretcher, after the film had been stretched, it was maintained in the stretched condition until its temperature fell below 140° C.

In preparing Sample 3, an approximately 0.05 mm film was made on a 1.9 cm Brabender extruder operated at 177° C. and 70 rpm from pellets consisting essentially of an amorphous PPC (QPAC 40 resin). The typical $T_g$ of which is 40° C., and the typical melt flow index of which is 0.9 g/10 min at 150° C./2160 g per ASTM Test Method D-1238. The 0.05 mm amorphous PPC film was placed between two panels of the 0.3 mm cast polypropylene film, and the combination was compressed at 171° C. at 846 kg/cm$^2$ pressure for 2 minutes, and cooled while compressed under this pressure. Subsequently, the film was biaxially oriented on a T. M. Long film stretcher operated at 7.6 cm/sec and 145° C. to give a 6X—6X simultaneous stretch. In the operation of the stretcher, after the film had been stretched, it was maintained in the stretched condition until its temperature fell below 140° C.

Sample 4 was made from 95 parts by weight of pellets consisting essentially of predominantly crystalline polypropylene from the same lot used in making Samples 1–3, and 5 parts by weight of pellets consisting essentially of amorphous PEC from the same lot used in making Sample 2. The pellets were blended and melt extruded in a two-pass operation in which the extrudate from the first pass was pelletized and again extruded and pelletized. A portion of the resulting pellets of the blend was then compression molded under these conditions: 5 minute warm-up to 213° C.; at this temperature increasing compression to 2820 kg/cm$^2$ over 2 minutes and holding at this pressure for 1 minute; and then cooling at this pressure until the temperature was below 140° C. Subsequently, the film was biaxially oriented on a T. M. Long film stretcher operated at 7.6 cm/sec and 155° C. to give a 6X—6X simultaneous stretch. In the operation of the stretcher, after the film had been stretched, it was maintained in the stretched condition until its temperature fell below 140° C.

After visual inspection and hand testing of the Samples 2 and 3 films, an experienced polypropylene applications professional made observations to the effect that the films had remarkable clarity and did not delaminate.

Differential scanning calorimetry ("DSC") testing of film samples 1–4 resulted in crystalline melt endotherms on DSC scans from which the values in the following Table I were determined:

TABLE I

| Sample No. | Melt Onset (°C.) | Melt Peak (°C.) | Melt Onset (°C.) | Melt Peak (°C.) |
|---|---|---|---|---|
| 1 | 162.2 | 168.4 | — | — |
| 2 | 155.5 | 168.9 | 238.7 | 240.2 |
| 3 | 161.2 | 170.7 | 265.0 | 270.5 |
| 4 | 163.4 | 171.2 | — | — |

The melt data in the two left-hand melt data columns reflect the presence of crystalline polypropylene in the samples. The melt data in the two right-hand melt data columns reflect the presence of crystalline PEC in Sample 2, and of crystalline PPC in Sample 3. Also, the melt peaks in the two right-hand melt data columns are at temperatures significantly higher than the decomposition temperatures of amorphous PEC (220° C.) and amorphous PPC (250° C.). The absence of melt onset and melt peak values in the two right-hand melt data columns reflects the absence of other crystalline polymer components in Samples 1 and 4. Hence, biaxially orienting a blend of predominantly crystalline polypropylene with a small amount of amorphous PEC does not appear to make the amorphous PEC crystalline.

Oxygen transmission rate testing (ASTM Test Method D3985) of the samples at 23° C. resulted in the data set forth in Table II.

TABLE II

| Sample No. | Film Thickness (mm) | Rate cc/645.2 cm²/24 hrs |
|---|---|---|
| 1 | 1.9 | 148 |
| 2 | 1.9 | 24.8 |
| 3 | 1.5 | 89.7 |
| 4 | 2.0 | 142 |

The data in Table II show substantial decreases in oxygen transmission rates for polypropylene films comprising barrier layers consisting essentially of crystalline PACs. The data also suggest that a small amount of an amorphous PAC blended in predominantly crystalline polypropylene does not significantly improve the oxygen transmission property of the polypropylene.

Hence, the invention has a number of features of advantage.

Other features, advantages, embodiments, improvements, details and uses within the letter and spirit of the foregoing disclosures, and within the scope of this patent, which is limited only by the following claims construed in accordance with the patent law, including the doctrine of equivalents, will be readily apparent from the disclosures to those exercising ordinary skill in the art. Also, while specific embodiments of the invention have been described in considerable detail, variations and modifications of them can be effected without departing from the spirit and scope of the invention.

I claim:

1. Oriented amorphous poly(ethylene carbonate).
2. Oriented amorphous poly(propylene carbonate).
3. Poly(ethylene carbonate) with crystallinity to the extent of having a melting point.
4. Poly(propylene carbonate) with crystallinity to the extent of having a melting point.
5. A method of orienting an amorphous poly(alkylene carbonate), which comprises stretching it at a temperature above its glass transition temperature, but below its decomposition temperature, and maintaining it in the stretched condition.
6. A method according to claim 5 in which the extent of stretching is sufficient to cause the poly(alkylene carbonate) to have crystallinity to the extent of having a melting point.
7. A method according to claim 6 in which the stretching is at a temperature in the range of 120°–150° C.
8. A high oxygen barrier, high clarity laminate having high resistance to delamination, which comprises at least two plys, the first of which consists essentially of an oriented poly(alkylene carbonate), and the second of which consists essentially of a low oxygen barrier, oriented predominantly crystalline polymer with said first ply being in direct or indirect adherence to the second ply.
9. A laminate according to claim 8 in which said oriented poly(alkylene carbonate) has crystallinity to the extent of having a melting point.
10. A laminate according to claim 9 in which said first ply is sandwiched between said second ply and a third ply consisting essentially of a predominantly crystalline polymer different from the poly(alkylene carbonate) with said first ply being in direct or indirect adherence to said third ply.
11. A laminate according to claim 10 in which the predominantly crystalline polymer is predominantly crystalline polypropylene.
12. A laminate according to claim 9 in which the poly(alkylene carbonate) is poly(ethylene carbonate).
13. A laminate according to claim 9 in which the poly(alkylene carbonate) is poly(propylene carbonate).
14. A method for making a high oxygen barrier, high clarity, laminate having high resistance to delamination, which method comprises:
    (1) forming a laminate with at least two plys, the first of which consists essentially of an orientable, predominantly crystalline polymer unoriented in the direction of at least one axis of the plane of the ply, and the second of which consists essentially of an amorphous poly(alkylene carbonate), said second ply being in direct or indirect adherence to the first ply;
    (2) with the temperature of the first ply being in the range in which the polymer is orientable, but below the decomposition temperature of the amorphous poly(alkylene carbonate), stretching the laminate in at least said direction until both the predominantly crystalline polymer ply and the poly(alkylene carbonate) ply have become substantially oriented in that direction; and
    (3) while maintaining the laminate in the stretched condition, cooling the laminate to a temperature at which the predominantly crystalline polymer and thus the poly(alkylene carbonate) retain their orientations.
15. A method according to claim 14 in which the laminate has been stretched in at least said direction until the predominantly crystalline polymer ply has become sufficiently oriented in that direction to cause the poly(alkylene carbonate) to become crystalline to the extent of having a melting point.

16. A method according to claim 15 in which said second ply is sandwiched between said first ply and a third ply consisting essentially of an orientable, predominantly crystalline polymer unoriented in at least said direction, and with said second ply being in direct or indirect, adherence to said third ply.

17. A method according to claim 15 in which the first and third predominantly crystalline polymer plys of the laminate of step (1) are unoriented in both the X and Y axes of the plys, and in step (2) the laminate is stretched in the directions of both said axes until each ply has become biaxially oriented.

18. A method according to claim 17 in which the orientable predominantly crystalline polymer in both the first and third plys is predominantly crystalline polypropylene.

19. A method according to claim 15 in which the poly(alkylene carbonate) is poly(ethylene carbonate).

20. A method according to claim 15 in which the poly(alkylene carbonate is poly(propylene carbonate).

* * * * *